T. P. Granger,
Bench Plane.
No 41,258.  Patented Jan. 12, 1864.
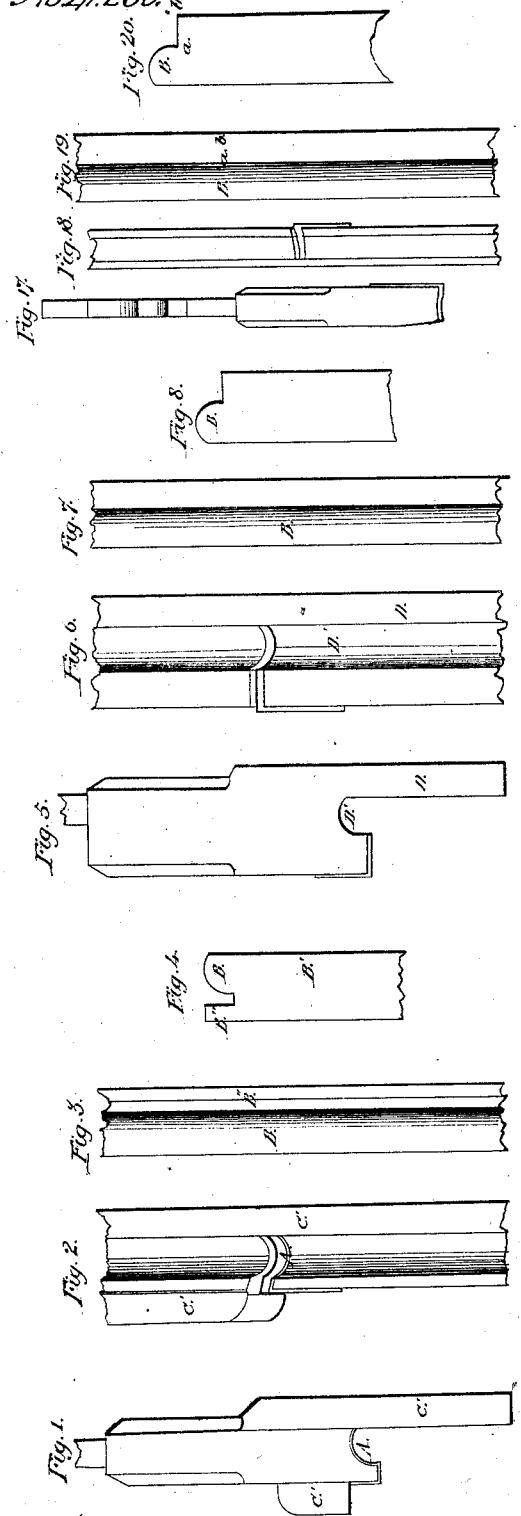
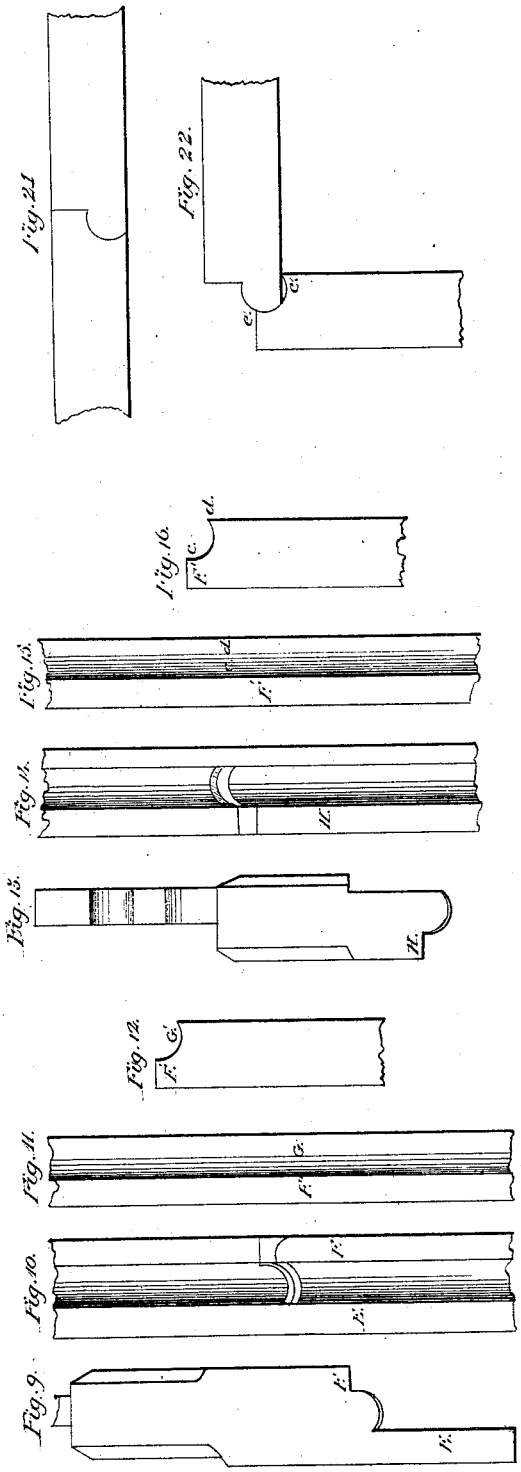
Witnesses: A. J. Thompson, A. S. Van Dyke
Inventor: T. B. Granger

UNITED STATES PATENT OFFICE.

T. P. GRANGER, OF PECATONICA, ILLINOIS, ASSIGNOR TO HIMSELF AND JOSIAH BEST.

IMPROVEMENT IN PLANES FOR JOINTING TABLE-LEAVES.

Specification forming part of Letters Patent No. 41,258, dated January 12, 1864.

*To all whom it may concern:*

Be it known that I, T. P. GRANGER, of Pecatonica, in the county of Winnebago and State of Illinois, have invented new and useful Improvements in Planes for Jointing Table-Leaves; and I do hereby declare that the following is a full and complete description of the construction and operation of the same, reference being had to the accompanying drawings, making part of this specification, in which—

Figure 1 is an end view of the first plane used in forming the bed part of the joint. Fig. 2 is a face view of the same plane. Fig. 3 is an edge view of the bed-leaf after the first plane has been used upon it; and Fig. 4 is an end view of the same. The plane, Figs. 1 and 2, is so formed, as shown at A, as to cut the "round" B on the bed-leaf.

The bed-leaf is first prepared by being jointed on the lower side and edge, the guide C working against the lower side, B', Fig. 4. A stop, C', on the opposite side of the plane, by coming in contact with the edge of the leaf B'', determines the depth to which the plane cuts. Planes, Figs. 5 and 6, show an end and face view of the second plane to be used upon the bed. This is for cutting away B'', Fig. 4, which has been left by the first operation. The guide D works flat against the lower side of the leaf, the groove D' forming a stop by coming in contact with B, Fig. 3. After the planes, Figs. 5 and 6, have been used the edge of the leaf presents the appearance shown in Figs. 7 and 8. I now use the planes shown in Figs. 17 and 18, for the purpose of cutting the round B to a sharper angle with the square portion of the leaf, as shown at *a b* in Figs. 19 and 20. This operation finishes the bed-leaf. The fall-leaf is first prepared for making the joint by being jointed upon the under side and upon the joint edge. I then apply the plane shown in Figs. 9 and 10, the guide E working against the under side of the leaf. The face F of the plane coming in contact with the square edge of the leaf F', determines the depth to which the groove G is cut in the edge of the leaf; but as this plane does not cut the groove G quite deep enough to fit the round B on the bed-leaf. I apply the plane shown in Figs. 13 and 14. The face H coming in contact with the edge F', determines the depth to which this plane cuts the groove, which is shown complete at *c d* in Figs. 15 and 16. The table-butts are now set in the usual manner, and the leaf presents the structure and adjustment shown in Figs. 21 and 22. A table-joint thus constructed presents this peculiar feature, that when the leaf is down, as in Fig. 22, the inner angle of the leaf comes in contact with the under edge of the bed, as at *e*, and thus raises the fall-leaf higher up on the bed-leaf, as shown at *e'*, thereby making a better and more durable joint.

What I claim as my improvement, and desire to secure by Letters Patent, is—

The herein-described series of planes for setting table-joints, the same being constructed and used in the manner and for the purpose herein set forth.

T. P. GRANGER.

Witnesses:
A. S. VAN DYKE,
A. J. THOMPSON.